(12) United States Patent
Tahan

(10) Patent No.: US 7,447,782 B2
(45) Date of Patent: Nov. 4, 2008

(54) COMMUNITY ACCESS CONTROL IN A MULTI-COMMUNITY NODE

(75) Inventor: Thomas E. Tahan, La Jolla, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1440 days.

(21) Appl. No.: 09/981,608

(22) Filed: Oct. 16, 2001

(65) Prior Publication Data

US 2002/0078215 A1 Jun. 20, 2002

Related U.S. Application Data

(60) Provisional application No. 60/256,578, filed on Dec. 18, 2000.

(51) Int. Cl.
*G06F 15/16* (2006.01)
(52) U.S. Cl. .................. 709/229; 709/228; 709/225; 711/163
(58) Field of Classification Search ................ 709/229, 709/225, 228; 713/201, 165–167; 707/9; 711/163
See application file for complete search history.

(56) References Cited

U.S. PATENT DOCUMENTS

| | | | | |
|---|---|---|---|---|
| 5,265,221 | A * | 11/1993 | Miller | 711/163 |
| 5,335,346 | A * | 8/1994 | Fabbio | 711/163 |
| 5,724,578 | A * | 3/1998 | Morinaga et al. | 707/100 |
| 6,105,027 | A | 8/2000 | Schneider et al. | |
| 6,377,994 | B1 * | 4/2002 | Ault et al. | 709/229 |
| 6,564,228 | B1 * | 5/2003 | O'Connor | 707/200 |
| 6,658,415 | B1 * | 12/2003 | Brown et al. | 707/10 |
| 6,772,157 | B2 * | 8/2004 | Barnett et al. | 707/9 |
| 6,772,350 | B1 * | 8/2004 | Belani et al. | 726/2 |
| 2002/0078215 | A1 * | 6/2002 | Tahan | 709/229 |

OTHER PUBLICATIONS

International Search Report, PCT/US 01/49280, Mailed Mar. 4, 2003.
Geihs K et al.: "An Architecture for the Cooperation of Heterogeneous Operating Systems"; Computer Networking Symposium, 1988., Proceedings of the Washington, DC, USA Apr. 11-13, 1988.

(Continued)

*Primary Examiner*—Nathan J. Flynn
*Assistant Examiner*—Asghar Bilgrami
(74) *Attorney, Agent, or Firm*—Meyertons Hood Kivlin Kowert & Goetzel, P.C.; Rory D. Rankin

(57) ABSTRACT

A method and mechanism of enforcing community access control in a computer network, wherein access to objects by users and processes is controlled. A Multi-Community Node (MCN) processes information for users in multiple communities and must enforce a community separation policy. The enforcement method and mechanism use a database of associations of sets of communities corresponding to users, processes, and system objects. Upon receiving a request for access to an object by a user, the MCN permits access if a user community set (UCS) of the user is a superset of an object community set (OCS) of the object; otherwise, access is denied. Upon receiving a request for access to an object by a process, the MCN permits access if an application process community set (ACS) of the process is a superset the OCS of the object; otherwise, access is denied.

28 Claims, 14 Drawing Sheets

OTHER PUBLICATIONS

"Department of Defense Trusted Computer System Evaluation Criteria," Dec. 1985, pp. 1-82.

Fithen et al., "Deploying Firewalls," May 1999, pp. 1-63.

"Trusted Solaris™ 8 Operating Environment," Nov. 2000, pp. 1-24.

"SunScreen™ Secure Net 3.0," Jul. 1999, pp. 1-66.

* cited by examiner

Network Interface-Community Association (NICA) — 530

| Network Interface Identifier 531 | Interface Community Set (IFCS) 532 | Description 533 |
|---|---|---|
| if0 | A,D,G,M,Q | Community {A,D,G,M,Q} Network |
| if1 | D,Q | Community {D,Q} Network |
| if2 | A | Community {A} Network |
| if3 | G | Community {G} Network |
| if4 | M | Community {M} Network |

Network Address-Community Association (NACA) — 540

| Network Address, Address List or Address Range 541 | Network Address Community Set (NACS) 542 | Description 543 |
|---|---|---|
| 195.10.*.1 | A,D,G,M,Q | MCN 510's Network Interfaces |
| 195.10.1.2-195.10.1.254 | A,D,G,M,Q | Community {A,D,G,M,Q} Nodes |
| 195.10.2.2-195.10.2.14 | D,Q,X | Community {D,Q,X} Nodes |
| 195.10.3.2-195.10.3.62 | A | Community {A} Nodes |
| 195.10.4.2-195.10.4.110 | G | Community {G} Nodes |
| 195.10.5.2-195.10.5.225 | M | Community {M} Nodes |

*Fig. 5*

COMMUNITY ACCESS CONTROL IN A MULTI-COMMUNITY NODE

CROSS REFERENCE TO RELATED APPLICATIONS

This application claims benefit of priority to Provisional Application Ser. No. 60/256,578 filed Dec. 18, 2000, entitled "Community Separation Control in a Multi-Community Node."

BACKGROUND OF THE INVENTION

1. Field of the Invention

This invention is related to the field of computer network security and, more particularly, to controlling access to system objects by separate communities.

2. Description of the Related Art

With the ever expanding use of computer networks throughout society and the increasing interconnection of computer networks and users has come an increasing importance on maintaining the security of data. It is common for enterprise computer networks to have more than one user community, each with its own set of data. For example, a bank may have a production community which includes persons who are involved in the day to day workings of the bank. In addition, a bank may have a development community which includes persons working to develop and test new banking computer applications. Further, a bank may have a public web site which allows Internet users to obtain information or services related to the bank. Each of these user communities requires access to different sets of data which in some cases may be mutually exclusive.

In an enterprise network, some computing resources may be dedicated to users of a single community, and others may be shared among users of multiple communities. Single Community Nodes (SCNs) are network nodes (e.g., computers, networking equipment, etc.) processing information on behalf of users in a single community. Multi-Community Nodes (MCNs) are network nodes processing information on behalf of individuals in more than one community. Examples of MCNs include servers, routers, and administrative workstations. Executing on MCNs are Multi-Community Applications (MCAs). MCAs are software performing functions on behalf of users in more than one community. MCAs may run within the operating system kernel or communications protocol software, or may be programs running under the control of the operating system in an MCN.

Generally, an enterprise has in place a network security policy which includes a community separation policy stating that the data of a particular community should only be accessible by members of that community. Consequently, each user on the computer network must be prohibited from: (1) accessing the data of a community of which he is not a member, and (2) exposing the data of a community of which he is a member to a user outside that community. When resources such as MCNs are shared by users in more than one community, the potential for a breach of the community separation policy is increased and adequate enforcement of the policy takes on greater importance. Threats to the security of computer network data include threats from "external intruders" and threats from "malicious insiders". An external intruder is a user in one community who attempts to access or modify the data of another community, or disrupt service in another community by interfering with the normal and proper operations of the computer resources used by the other community. On the other hand, a malicious insider is a user in one community who attempts to leak data from his own community to a user in another community, by sending data packets to another community, causing data packets from his community to be misrouted, making data from his community available to external intruders, or otherwise using computer resources to leak or signal information. It should be noted that an insider may inadvertently leak information to another community due to human error or faulty software logic. This may have the same effect as the malicious insider who deliberately causes such leakage.

One well known method of providing for community separation in multi-community enterprise networks includes segmenting the network by community such that all computing resources are dedicated to a community and no resources are shared between communities. The network segmentation methods involve replicating servers, routers, bridges, hubs, switches, and cables, thereby physically segregating user communities. However, such a replication technique is not only costly, it also provides significant operational complexities. For example, one type of server is a network management station. If such a station were replicated and each station's access were physically restricted to a single community's computing resources, the network administrator for the enterprise would be able to monitor and control only the network resources for a single community from a single station. However, the role of the network administrator requires monitoring and control of the entire network. Hence, the security approach significantly complicates the management of the network.

Another practiced method of providing community separation is to use firewalls to control the flow of information between communities. A firewall is a method used to control information flow between two or more networks by blocking or permitting flows according to a predetermined set of rules based on the source and destination of the data, the requested service, and other criteria. Firewalls are frequently used by an enterprise to control the access of those on an external network, such as the Internet, to the enterprise's inner network. Firewalls may also be used to protect some parts of an inner network from other parts of an inner network. However, the rules associated with firewalls can be complex and onerous to set up. It is also difficult to validate that the rule set enforces community separation, and such validation must be done each time the rules are modified.

A third method of providing community separation involves incorporating support in applications on the network for cryptographic protocols and data security methods. However, such an approach is undesirable as it can be very costly in application development and can be operationally burdensome to administer.

To further provide for data security, it is common for the network topology and node connectivity to be controlled. Such controls may include physical separation, logical separation (such as in Virtual Local Area Networks [VLANs]), special privileges or authorizations, or cryptographic methods (such as Virtual Private Networks [VPNs]). Such methods typically provide that each network node is physically or logically connected to a network (including a network segment, subnetwork, VLAN, network zone, network partition, network tunnel, or VPN) only if the node is authorized to access the community data being communicated over the network.

In addition, Multi-Community Applications may be designed so that they may be "trusted", i.e., do not violate the community separation policy. In particular, when an MCA sends information to a user on another network node, it is trusted not to disclose information belonging to communities of which that user and his computer are not members. Some MCNs are "closed" nodes on which only trusted MCAs are allowed to run and which do not allow unrestricted user access. However, even if the MCAs are trusted, the networking protocols within the MCN could allow community information to be disclosed in violation of the community separation policy, especially if they do not contain mechanisms which explicitly provide for community separation enforcement.

SUMMARY OF THE INVENTION

Broadly speaking, a method and mechanism of community access control in a multi-community node are contemplated. Generally, the method and mechanism include receiving a request for access to an object from a user and permitting access to the object in response to detecting a user community set (UCS) of that user is a superset of an object community set (OCS) of the object. If the received request for access is from a process, access is permitted if an application process community set (ACS) of that process is a superset of the object OCS. A community information base (CIB) maintains associations between objects, users and processes. In this manner, control of access to system objects by separate communities may be maintained. Other embodiments are described herein.

BRIEF DESCRIPTION OF THE DRAWINGS

Other objects and advantages of the invention will become apparent upon reading the following detailed description and upon reference to the accompanying drawings in which:

FIG. 5 is an illustration of an exemplary community information base.

Figure 1:
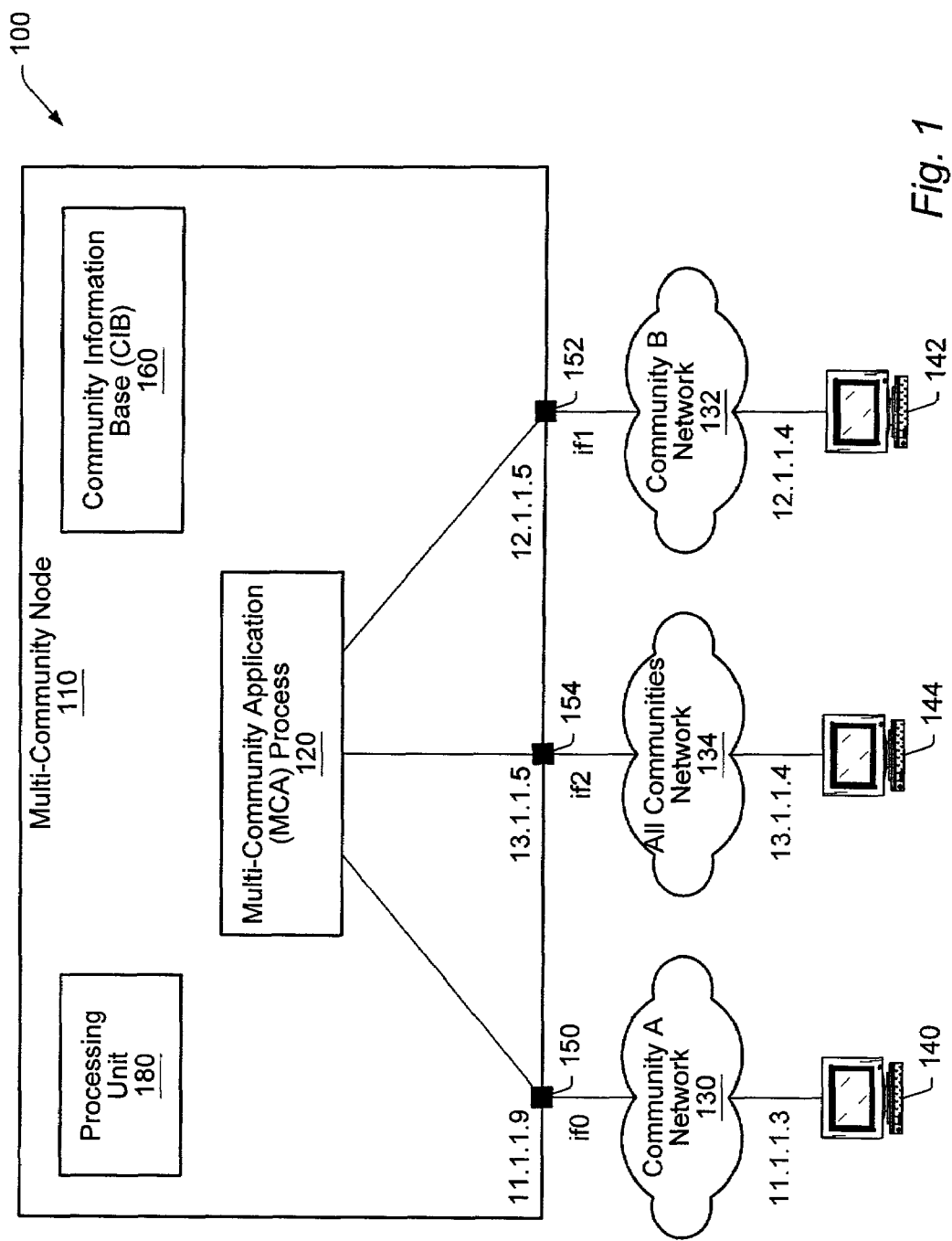
FIG. 1 is a diagram of one embodiment of a closed MCN in a multi-community network.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but to the contrary, the intention is to cover all modifications, equivalents and alternatives falling within the spirit and scope of the present invention as defined by the appended claims.

DETAILED DESCRIPTION

Overview

Turning now to FIG. 1, a diagram illustrating one embodiment of a computer network 100 is shown. Included in computer network 100 is MCN 110, a node serving a set of user communities including communities A, B, and any other communities in network 100. Also on network 100 is another MCN, 144, serving the same communities as MCN 110, and two single community nodes: a community A node 140, and a community B node 142.

Community network 100 contains three subnetworks. Network 130, used for community A communications, Network 132, used for community B communications, and network 134, used for communications between MCN 110 and MCN 144 which could potentially contain data for any community.

MCN 110 includes interfaces if0 150, if1 152, and if2 154. MCN 110 also includes a Multi-Community Application Process (MCA) 120, which is assumed to be trusted not to leak data between communities, and Community Information Base (CIB) 160. Community A network 130 is coupled to MCN 110 via interface if0 150, community B network 132 is coupled to MCN 110 via interface if1 152, and the all communities network 134 is coupled to MCN 110 via interface if2 154. Also included in MCN 110 is processing unit 180. Processing unit 180 may be a general purpose processor which may be configured to execute software or may be special purpose logic which is specifically designed for data packet filtering operations and other functions. In FIG. 1, community A network 130 and community B network 132 represent separate user communities and all communities network 134 represents a network accessible by MCNs serving all user communities. FIG. 1 also shows exemplary addresses associated with MCN 110 network interfaces and with the network interfaces of other network nodes. Interfaces if0 150, if1 152, and if2 154 have addresses 11.1.1.9, 12.1.1.5, and 13.1.1.5, respectively. Hosts 140, 142, and 144 have addresses 11.1.1.3, 12.1.1.4, and 13.1.1.4, respectively. For illustrative purposes, Internet Protocol (IP) version 4 addresses are used in the description herein. However, IPv6 addresses or addresses of any other network layer or data link layer protocol may also be used. In one embodiment, MCN 110 includes a number of processors and is running a single instance of an operating system.

Community Route Filtering

As shown in FIG. 1, the network topology is designed to keep user communities separated. In the embodiment shown, only MCNs have the capability to violate the community separation policy. With this topology, if MCNs enforce community separation, then enforcement is network-wide. More precisely, in this embodiment, the following topology rule is enforced when the network administrators connect the network nodes to the network and configure the network switches and other network components and mechanisms: a node may be physically or logically connected to a network only if the community or set of communities of the node includes the community set of the network. The term "network" as used herein includes a subnetwork, network segment, virtual local area network (VLAN), network partition, network zone, virtual private network (VPN), network tunnel, or any other suitable configuration. The community set of a network is the set of communities for which information may be communicated over the network, not to include communities whose information is encrypted in a manner preventing access by nodes attached to the network.

In one embodiment, MCN 110 is a closed node. It is assumed that all application software running on MCN 110, referred to as Multi-Community Applications (MCAs), are trusted to enforce community separation. The MCN 110 is further assumed to not allow unrestricted user access. Users are permitted to access information in the MCN only if the access is permitted by the MCAs on the MCN 110.

With these assumptions, what is desired is a mechanism to ensure that the protocol software in the MCN 110 provides community separation enforcement and that the MCN policy enforcement cannot be compromised by entities outside the MCN. In general, MCN 110 either generates packets to send to a variety of destinations, or receives packets from other nodes to be processed by the MCA 120 or to be forwarded to a variety of destinations. In one embodiment, to ensure that community separation policy is enforced for MCN 110's network communications, a Community Route Filter (CRF) in the protocol stack of MCN 110 applies rules on each incoming or outgoing packet. If an incoming or outgoing packet is being routed in compliance with the community separation policy, the packet is allowed to pass through the filter. Otherwise, the packet is discarded and the event may be recorded in a log of security relevant events and other events.

Generally speaking, functions performed by the CRF in MCN 110 may include, but are not limited to, the following: (1) preventing communications from a network used by one community or communities to a network used by different communities; (2) ensuring that packets sent by the MCN are output on an interface attached to a network for the intended community, determined from the communities associated with the source and destination network addresses; and (3) detecting when remote nodes communicating with the MCN spoof their source network address to masquerade as a node in another community.

In another embodiment, the MCN is configured to control routing table updates so that all of the entries in the table comply with the community separation policy. In addition, a packet forwarding filter may be inserted in the protocol stack for packets being forwarded by the MCN from one network interface to another in order to ensure that there is a community in common between the incoming and outgoing networks' community sets.

In the descriptions contained herein the following notation is used:

- A "Community Set" is a set of communities, which may consist of no communities (the null community set) or any number of communities. Each individual community within the community set is said to be a "member" of the set.
- "Curly brackets { }" indicate a set of communities encompassed by the brackets, e.g., {a, b, c, . . . }, indicates the set of communities a, b, c, etc., where the names of the member communities are encapsulated in the curly brackets, separated by commas.
- The "intersection" of two sets is the set of members belonging to both sets. An "ampersand" indicates an intersection of two communities or sets of communities, e.g., x & y, indicates the intersection of two sets x and y, where the names of the communities being intersected precede and follow the ampersand.
- A set X is a "superset" of a set Y if and only if all members of Y are also members of X. It is said that X "includes" Y when X is a superset of Y.
- A set X is a "subset" of a set Y if and only if all members of X are also members of Y. It is said that X "is included in" Y when X is a subset of Y.

Community Route Filtering Approach 1

In one embodiment, to ensure that community separation policy is enforced for MCN 110's network communications, a Community Route Filter (CRF) in the protocol stack of MCN 110 applies rules on each incoming or outgoing packet. The packet's source and destination network address are used to determine the user community or set of communities to which a packet belongs. The CRF ensures that a packet can never flow to networks outside that packet's communities. If an incoming or outgoing packet is being routed in compliance with the community separation policy, the packet is allowed to pass through the filter. Otherwise, the packet is discarded and the event is recorded in a log of security relevant events and other events.

Community Information Base (CIB)

The CRF rules use information configured into the MCN 110 by a trusted administrator, either directly, remotely, or through a management station. In one embodiment, this information is called a Community Information Base (CIB) for the MCN. In the embodiment shown in FIG. 1, two associations are maintained in the CIB: (1) for each node in the enterprise network (identified by the node's network address), the user community or set of communities which the node serves, and (2) for each network interface on the MCN, the user community or set of communities associated with the network attached to the network interface. Association 1 may be referred to as the Network Address Community Set (NACS). Addresses from the Internet Protocol (IP) or other network layer or data link layer protocols may be used. Association 2 may be referred to as the Interface Community Set (IFCS). The MCN must protect the CIB from being modified by untrusted entities.

Packet Processing

The CRF rules described below specify the filtering applied to outgoing and incoming packets, respectively:

MCN Send Rule for Outgoing Packets
1. Determine the Packet Community Set (PCS) of the packet from the intersection of the source NACS and the destination NACS.
2. If the PCS is null (empty), discard the packet and record the event in a log of security relevant events and other events.
3. If the IFCS of the interface on which the packet will be output is not a superset of the PCS, discard the packet and record the event in a log of security relevant events and other events.
4. Allow transmit processing to proceed on the packet.

MCN Receive Rule for Incoming Packets
1. Determine the PCS of the packet from the intersection of the source NACS and the destination NACS.
2. If the PCS is null (empty), discard the packet and record the event in a log of security relevant events and other events.
3. If the IFCS of the interface on which the packet was received is not a superset of the PCS, discard the packet and record the event in a log of security relevant events and other events.
4. Allow receive processing to proceed on the packet.

Figure 2:
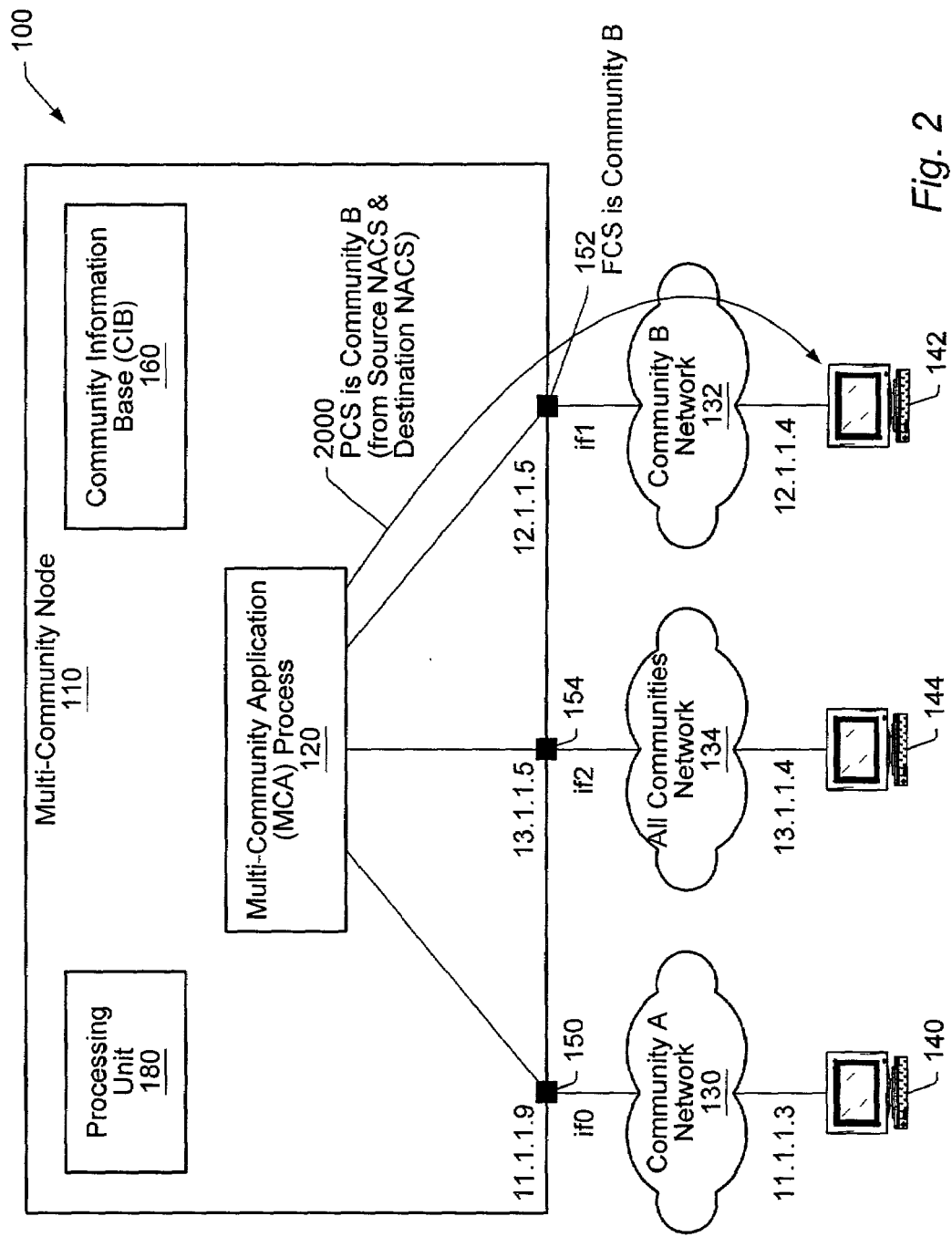
FIG. 2 is a diagram illustrating a community route filter send rule in a closed MCN.

FIG. 2 illustrates an example of a CRF send rule in computer network 100. In the example shown, assume that MCN 110 is processing an outgoing packet 2000 that was either generated within MCA 100, or received on one of MCN 110's network interfaces for forwarding to another network attached to MCN 110. Packet 2000 has an exemplary source NACS of {A,B,C} (the community set associated with MCN 110 and its network addresses), and a destination NACS of {B}. MCN 110 determines the PCS of packet 2000 to be {B}, the intersection of its source NACS {A,B,C} and destination NACS {B}. Because the PCS={B} is not null, the data packet is not immediately discarded. Next, MCN 110 validates whether the IFCS of if1, the interface on which the packet will be transmitted, includes the PCS of the packet. In this case, the IFCS={B} and the PCS={B}. Therefore, the data packet 2000 is allowed to be output on if1. If the IFCS did not include the PCS, the packet would be discarded and the event would be recorded in a log of security relevant events and other events.

Figure 3:
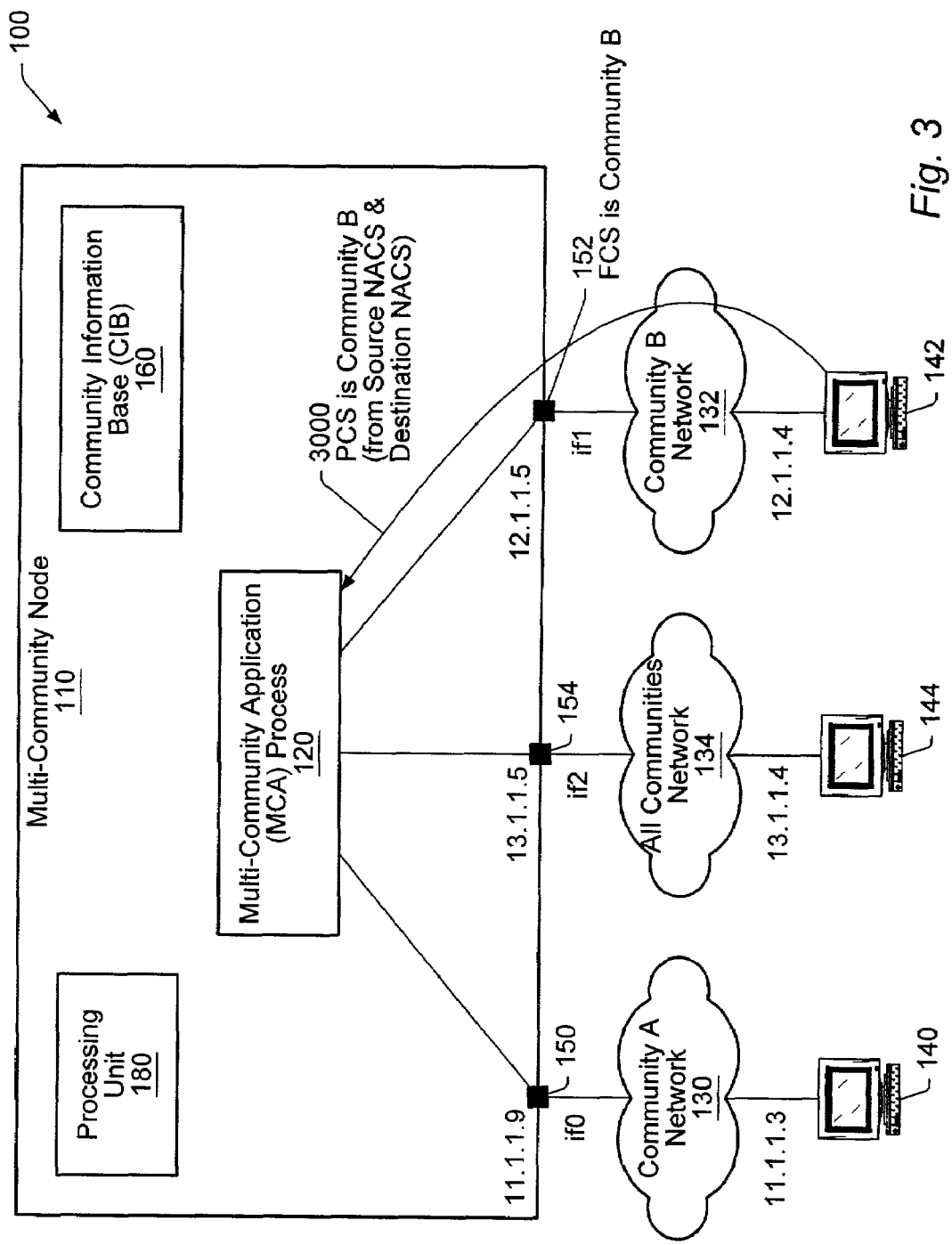
FIG. 3 is a diagram illustrating the community route filter receive rule in a closed MCN.

FIG. 3 illustrates an example of a CRF receive rule in computer network 100. In the example shown, MCN 110 is processing an incoming packet 3000 that was received on interface if1. Packet 3000 has a source NACS of {B} and a destination NACS of {A,B,C}. MCN 110 determines that the PCS of packet 3000 is {B}, the intersection of the source and destination NACS. Because the PCS={B} which is not null, the data packet is not immediately discarded. Next, MCN 110 validates whether the IFCS of if1, the interface on which the packet was received, includes the PCS of the packet. In this case, the IFCS={B} and the PCS={B}. Therefore, receive processing for the data packet 2000 is allowed to proceed. If the IFCS did not include the PCS, the packet would be discarded and the event would be recorded in a log of security relevant events and other events.

Figure 4A:
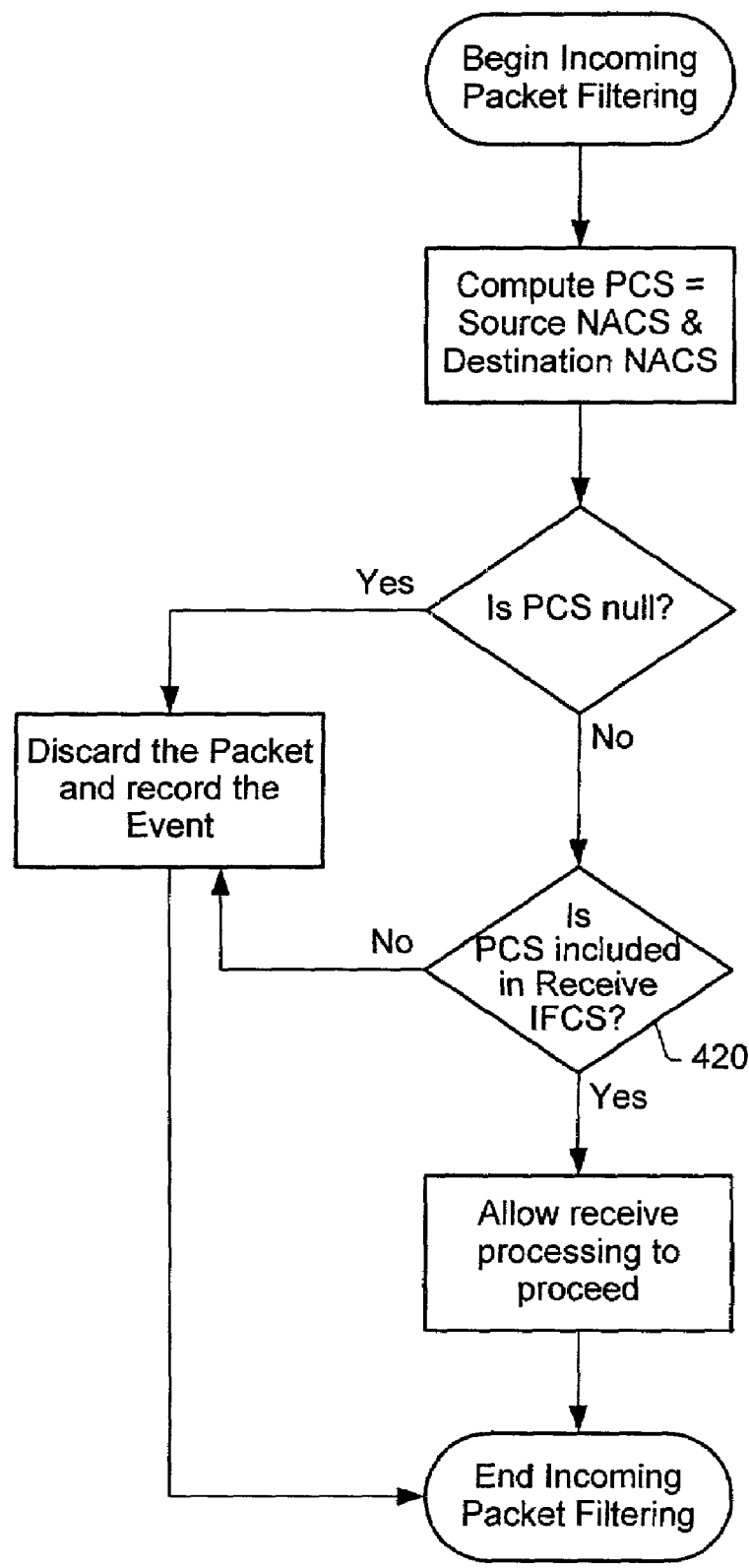
FIG. 4a is a flowchart illustrating one embodiment of a community route filter.

FIG. 4a is a flowchart illustrating one embodiment of a CRF. In the figure, it is assumed that the CRF is positioned between the data link layer and network layer, though alternative embodiments are possible and are contemplated. In FIG. 4a, the entry point "Begin Incoming Packet Filtering" is entered when a packet is received on one of MCN 110's network interfaces. The destination of the packet may be MCN 110, or MCN 110 may be forwarding the packet to another network. For incoming packet filtering, the CRF in MCN 110 computes the PCS from the intersection of the Source NACS and Destination NACS of the incoming packet. The PCS would be null if the source and destination nodes have no communities in common. Since attempts to communicate between such nodes is a violation of the community separation policy, the CRF discards the packet and records the event in a log of security-relevant and other events. If the PCS is not null, the CRF then checks whether the PCS is included in the IFCS of the interface on which the packet was received (decision block 420). If it is not, this is a violation of the community separation policy and the packet is discarded. For example, attacker on a node in Community A may be attempting to communicate with a peer on node in Community B by using an address in Community B as the source address of the packet, thereby masquerading as a Community B node. If the PCS is not included in the IFCS, the CRF discards the packet and records the event. If the PCS is not null, the CRF allows further packet receive processing to proceed.

Figure 4B:
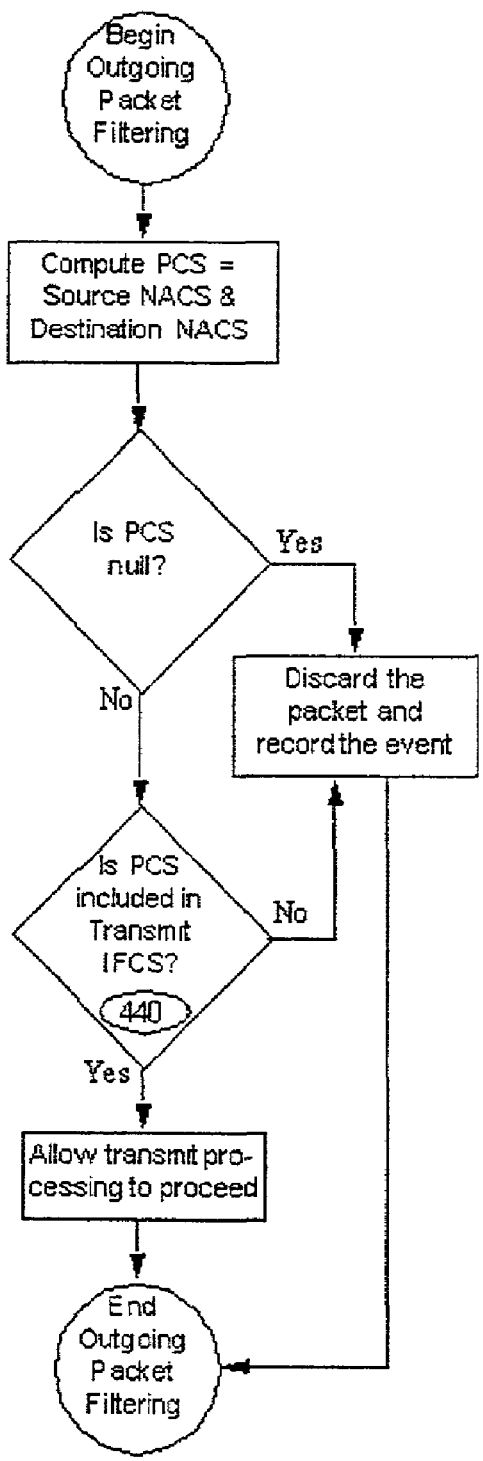
FIG. 4b is a flowchart illustrating one embodiment of a community route filter.

FIG. 4b is a flowchart illustrating one embodiment of a CRF applied to an outgoing packet. The outgoing packet may have been generated by MCN 110, or may have been received on one of MCN's network interfaces to be forwarded by MCN 110 and output on another network interface. For outgoing packet filtering, the CRF in MCN 110 starts with computing the PCS from the intersection of the Source NACS and the Destination NACS. A null PCS indicates a violation of the community separation policy and the CRF discards the packet and records the event in a log of security relevant events and other events. For example, an attacker in Community A may attempt to have MCN 110 forward a packet from a Community A network to a Community B network. If the PCS is not null, MCN 110 determines whether the PCS is included in the IFCS of the network interface on which the packet will be output (decision block 440). If it is not, a violation of the community separation security policy has been attempted, and the CRF discards the packet and records the event in a log of security relevant events and other events. Otherwise the CRF allows further transmit processing to proceed for the packet.

It should be noted that the application of community route filtering is "stateless" in that packets contain no special information related to previous rule applications and carry with them no labels or other history information to support the community route filtering, other than the data carried in the standard protocol headers. The stateless processing applies to incoming packets from the network destined for the MCN, outgoing packets originating within the MCN destined for the network, and packets received from the network to be forwarded to another network by the MCN. In the forwarding case, the incoming and outgoing CRF processing are independent of each other—no CRF state from incoming packet processing need to be retained to be applied in outgoing packet processing. Advantageously, packets need not be modified and filtering rules may be applied without specific knowledge of the history of the packet (i.e., they are stateless). Likewise, the following two approaches are stateless.

Community Route Filtering Approach 2

In an alternative embodiment, to ensure that community separation policy is enforced for MCN 110's network communications, a Community Route Filter (CRF) in the protocol stack of MCN 110 applies rules on each incoming or outgoing packet. The CRF prevents a packet from flowing to networks outside the packet's communities. The enforcement has the same effect as those of Approach 1, but the database is organized differently and rules may be expressed differently as specified below.

Community Information Base (CIB)

A trusted administrator configures two sets of addresses for each interface: (1) the Attached Address Set (AAS), which are the addresses on the attached network or networks, and (2) the Peer Address Set (PAS), which are the addresses on other networks or within the MCN with which the nodes on the attached network or networks may communicate.

Packet Processing

Using the associations in the CIB, the alternative CRF rules may be applied to the sending and receiving of packets:

Alternative MCN Send Rule for Outgoing Packets

1. Validate that the source network address of the packet is within the PAS associated with the interface over which the packet will be output.
2. If it is not, discard the packet and record the event in a log of security relevant events and other events.
3. Validate that the destination network address of the packet is within the AAS associated with the interface.
4. If it is not, discard the packet and record the event in a log of security relevant events and other events.
5. Otherwise, if the packet passes both validations, allow transmit processing to proceed on the packet.

Alternative MCN Receive Rule for Incoming Packets
1. Validate that the source network address of the packet is within the AAS associated with the interface over which the packet was received.
2. If it is not, discard the packet and record the event in a log of security relevant events and other events.
3. Validate that the destination network address of the packet is within the PAS of the interface over which the packet was received.
4. If it is not, discard the packet and record the event in a log of security relevant events and other events.
5. Otherwise, if the packet passes both validations, allow receive processing to proceed on the packet.

Community Route Filtering Approach 3

In another embodiment, the community separation policy is enforced by ensuring that all routing table entries in MCN 110 comply with the policy. This, combined with restrictions on packet forwarding between interfaces and source address spoofing protection on incoming packets, ensures that community separation is enforced on MCN 110.

Community Information Base (CIB)

A trusted administrator configures databases for a MCN community route filtering function. For each of the MCN's interfaces, the administrator enters the Interface Community Set (IFCS), specifying the community set associated with each interface, and the Attached Address Set (AAS), specifying the destination addresses or destination subnets/prefixes that are reachable through the interface.

Ensuring Route Table Compliance

In Approach 3, the MCN validates all routing table updates to ensure that table entries comply with the community separation policy. The MCN may receive routing table updates from a router, other network node, or system administrator. The updates specify the next hop to a destination address or destination subnet. When the MCN receives a routing table update, functions it performs may include the following:
1. Determining the network interface through which the next hop will be reached. In one embodiment, the interface may be specified in the routing table update, or may be determined by finding the interface whose network address prefix (e.g., for IPv4, the network number and subnet number) matches that of the next hop.
2. Checking whether the destination address is within the AAS of the network interface.
3. If it is not, discard the routing table update and record the event in a log of security relevant events and other events.
4. Otherwise, proceed with the routing table update.
5. As an alternative to step 2, the MCN may check that the NACS of the destination network address or network prefix is within the IFCS of the network interface through which packets for the destination will be routed.

Packet Processing

Outgoing Packets Originating on the MCN

The community separation enforcement relies on route table compliance with the community separation policy. If the route table complies, the MCN should never send a packet out a network interface (1) through which the destination address is not reachable and (2) whose community set does not include the community set associated with the destination.

Incoming Packets from an Attached Network

For incoming packets, the MCN:
1. Checks that the source address is within the AAS of the interface over which the packet was received.
2. If it is not, discards the packet and records the event in a log of security relevant events and other events.
3. Otherwise, allows receive processing to proceed.

Step 1 may be implemented as a simple address look up of the source address in the AAS. Alternatively, the routing table can be used, assuming incoming and outgoing routes are symmetrical. In this alternative, if the MCN were to send a packet back to the node with this source address, it would send it out the interface on which this packet was received.

Packets Forwarded from One Network Interface to Another

For packet received on one interface to be forwarded to another, the MCN:
1. Computes the intersection of the incoming interface's IFCS and the outgoing interface's IFCS.
2. If the intersection is not null, allows packet procession to proceed.
3. Otherwise, discards the packet and records the event in a log of security relevant events and other events.

Community Route Filtering Scenarios

FIG. 5 shows one embodiment of Community Information Base (CIB) 160 in an MCN 510 using Community Route Filtering approach 1. In the exemplary embodiment shown, two associations are maintained in the CIB: (1) The Network Interface-Community Association (NICA) 530, that specifies, for each of MCN 510's network interfaces, the associated user community or community set, and (2) the Network Address-Community Association (NACA) 540, that specifies, for each network address used by MCN 510, the associated user community or community set. Excerpts from CIB 160 will be used in the discussions of FIGS. 6 and 7.

The first row in NICA 530 shows if0 of MCN 510 attached to a network used to communicate information for communities A, D, G, M, and Q by nodes serving those communities. The second row shows if1 of MCN 510 attached to a network used to communicate information for communities D and Q by nodes serving those communities. The third through fifth rows show if2, if3, and if4 of MCN 510 attached to networks used by nodes in communities A, G, and M, respectively.

NACA 540 shows the community or community set associated with each network address, list of network addresses, or range of network addresses. An asterisk is a wildcard, a notational convention indicating that any valid value can be used in the field of the address where the asterisk is. For illustrative purposes, Internet Protocol (IP) version 4 addresses are shown. Other embodiments could use IP version 6, or any other network layer or data link layer protocol. The first row of NACA 540 shows network addresses 195.10.1.1, 195.10.2.1, 195.10.3.1, 195.10.4.1, etc. are associated with the set of communities {A,D,G,M,Q}. These addresses are assigned to the local network interfaces on MCN 510. The second row shows a range of addresses 195.10.1.2-195.10.1.254 used for MCNs serving the set of communities {A,D,G,M,Q}. The third row shows a range of addresses 195.10.2.2-195.10.1.14 used for MCNs serving the set of communities {D,Q,X}. The fourth, fifth, and sixth rows show the range of addresses used by nodes in communities A, G, and M, respectively.

Figure 6:
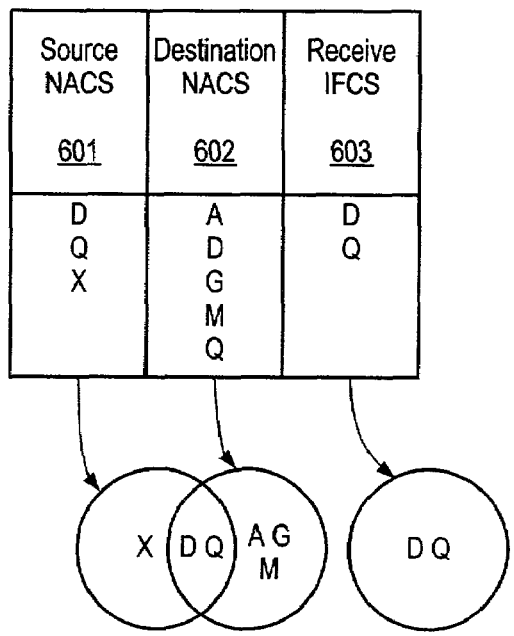
FIG. 6 illustrates the application of a community route filtering rule.

Turning now to FIG. 6, a scenario is presented in which MCN 510 has received a packet on one of its network interfaces if1 from an MCN 520, a node at address 195.10.2.5. MCN 510 serves communities A, D, G, M, and Q, while MCN 520 serves communities D, Q, and X. They have communities D and Q in common, and communicate information for their common communities over a network for communities D and Q. The IFCS on MCN 510 of the interface attached to the network over which the packet was received matches the community set of the network, i.e. {D,Q}. In the example shown, the NACS for each network address on MCN 510 is the same as the community set of the MCN.

In FIG. 6, MCN 510 queries the CIB's 160 NACA 540 for the community sets associated with the source and destination network addresses, illustrated as 601 and 602 in FIG. 6. It computes the PCS 604 from the intersection of the Source NACS 601 of MCN 520 {D,Q,X}, and the Destination NACS 602 of MCN 510 {A,D,G,M,Q}. The computed PCS 604 is {D,Q}. Since the PCS 604 is not null, no security violation of the community separation security policy has been attempted. Then, using information from the CIB's NICA 530, MCN 510 validates that the PCS is within the IFCS 603 for if1 on MCN 510, the network interface over which the packet was received. Since the IFCS is {D,Q} and the PCS is {D,Q}, there is no security violation, and MCN 510 proceeds with the receive processing for the packet.

Figure 7:
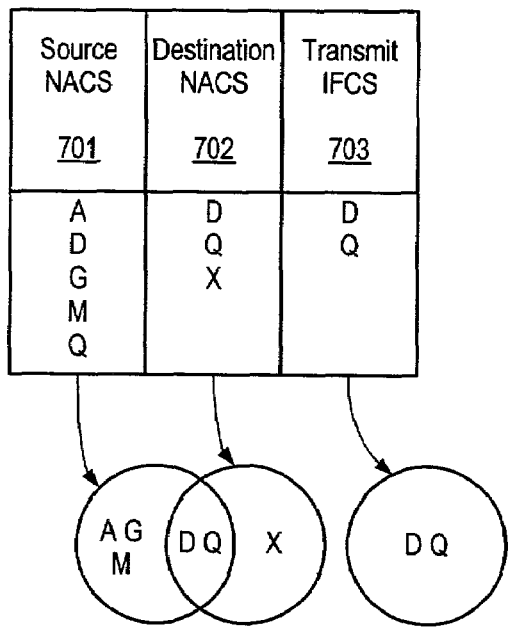
FIG. 7 illustrates the application of a community route filtering rule.

FIG. 7 illustrates a scenario in which MCN 510 is sending a packet to an MCN 520. MCN 510's CIB 160 is as illustrated in FIG. 5. MCN 510 computes the PCS 704 from the intersection of the Source NACS 701 for MCN 510 {A,D,G,M,Q} and the Destination NACS 702 for MCN 520 {D,Q,X}. The PCS is {D,Q}. Since the PCS is not null, no security violation of the community separation security policy has been attempted. MCN 510 then determines whether the PCS is within the IFCS 703 for if1, the network interface over which the packet will be transmitted. Since it is (i.e., they are both {D,Q}), MCN 510 proceeds with the transmit processing for the packet.

Community Route Filtering in Virtual Private Networks

A virtual private network (VPN) is a well known method whereby encryption and tunneling are used to create a private network while using a shared or public infrastructure, such as the Internet. For example, a particular enterprise may wish to provide a connection between its computer networks at sites which are located in different parts of the world. By using VPN technology, the enterprise may utilize the Internet for the communications while ensuring privacy and integrity. Alternatively, an enterprise may wish to share its network resources internally among users in multiple communities. Rather than use a physically separate network or virtual local area network for each community network, an enterprise may employ VPNs to carry traffic for each community over a shared network fabric. With VPNs, cryptographic methods are used to separate the traffic for each community over the same network resources, preventing users in one community from reading or modifying messages sent by users in a different community. VPNs are often (but not necessarily) implemented in the network layer, for example, in IP version 6 or the IP security extensions to IP version 4 (referred to as IPSec).

Figure 8:
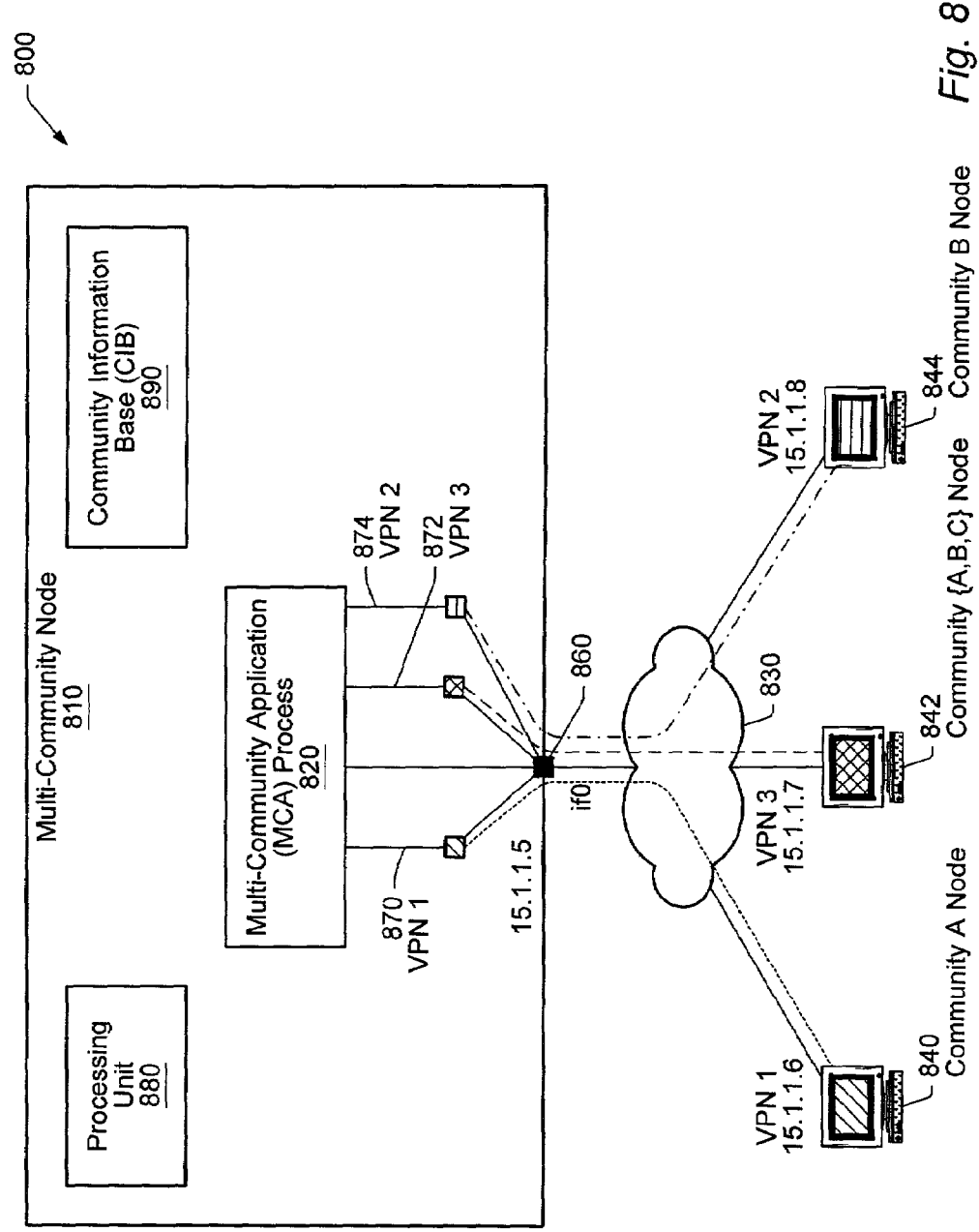
FIG. 8 is a diagram of an MCN using virtual private networks.

FIG. 8 is an illustration of a computer network 800 including three VPNs numbered VPN 1 870, VPN 2 874, and VPN 3 872. MCN 810 serves communities A, B, and C. Node 840 is a community A computer. It communicates with MCN 810 over VPN 1 870. Communications over VPN 1 870 travel encrypted over Encrypted Network 830. The encryption for VPN 1 870 is configured so that packets cannot be read or modified by entities outside of community A. The VPN encryption further allows authentication of the endpoints to each other, so that, at a minimum, they each can determine that the other is in community A. Communications between Community B Node 844 and MCN 810 are over VPN 2 874. Encrypted packets are carried over Encrypted Network 830. Communications between MCN 842, serving communities A, B, and C, and MCN 810, serving the same communities, are over VPN 3 872. Packets are encrypted and carried over Encrypted Network 830.

On MCN 810, the VPN interfaces all share a single physical interface, if0 860. A CIB 890 maintains an association between the VPNs and their communities or sets of communities (the VPN Community Set [VPNCS]). VPN 1 870 is associated with Community A, VPN 2 874 is associated with Community B, and VPN 3 872 is associated with the set of communities {A,B,C}. When MCN 810 sends packets out via network interface if0 860 to Nodes 840, 842, and 844, it encrypts the packets. Incoming packets received on if0 are decrypted, using cryptographic parameters associated with the VPN over which the message was communicated and using header information carried in the packet.

Any of the three Community Route Filtering approaches described above may be used with VPN, wherein the VPN may be treated as a subnet with network interfaces at each node communicating over the VPN. In one embodiment, the above described Community Route Filtering Approach 1 may be applied to VPNs. The VPNCS for each VPN is entered in MCN 810's CIB. Each network interface on MCB 810 may be assigned one of three encryption modes: Always Encrypt, Selective Bypass, or Never Encrypt. All data packets output over interfaces which have attribute Always Encrypt are encrypted, using cryptographic parameters and key for the appropriate VPN between the source and destination. All packets received from such a network are decrypted, using the cryptographic parameters for the VPN. For Selective Bypass interfaces, all data packets sent on the interface are encrypted using the appropriate VPN for the source and destination, except packets whose community sets are included in the Plaintext Community Set (PTCS) of the attached network. Received packets are decrypted if their headers indicate that they were encrypted. Selective Bypass may be used when nodes in the enterprise network share one or more common communities, but not all communities. For interfaces with the Never Encrypt attribute, encryption is not used.

The topology rule previously presented for the community route filtering also applies to VPNs. A node may access (read or write) a VPN if the community set of the node includes the community set of the VPN. The community set of a VPN is the set of communities for which information may be communicated over the VPN. Therefore, when the Always Encrypt attribute is set for all nodes sharing a network, then VPNs connect nodes which have common communities. When the Selective Bypass attribute is set for nodes sharing a network, a PTCS is associated with the network. Nodes with the Selective Bypass attribute configured on a network interface may be connected to a network over that interface if the community set of the node includes the PTCS of the network, and nodes may access a VPN if the node's community set includes the VPNCS. VPNs may be dynamically established or statically set up. The trusted network administrator configures VPNs to allow or prohibit nodes from accessing them using a variety of methods including cryptographic key distribution and access control.

Figure 9A:
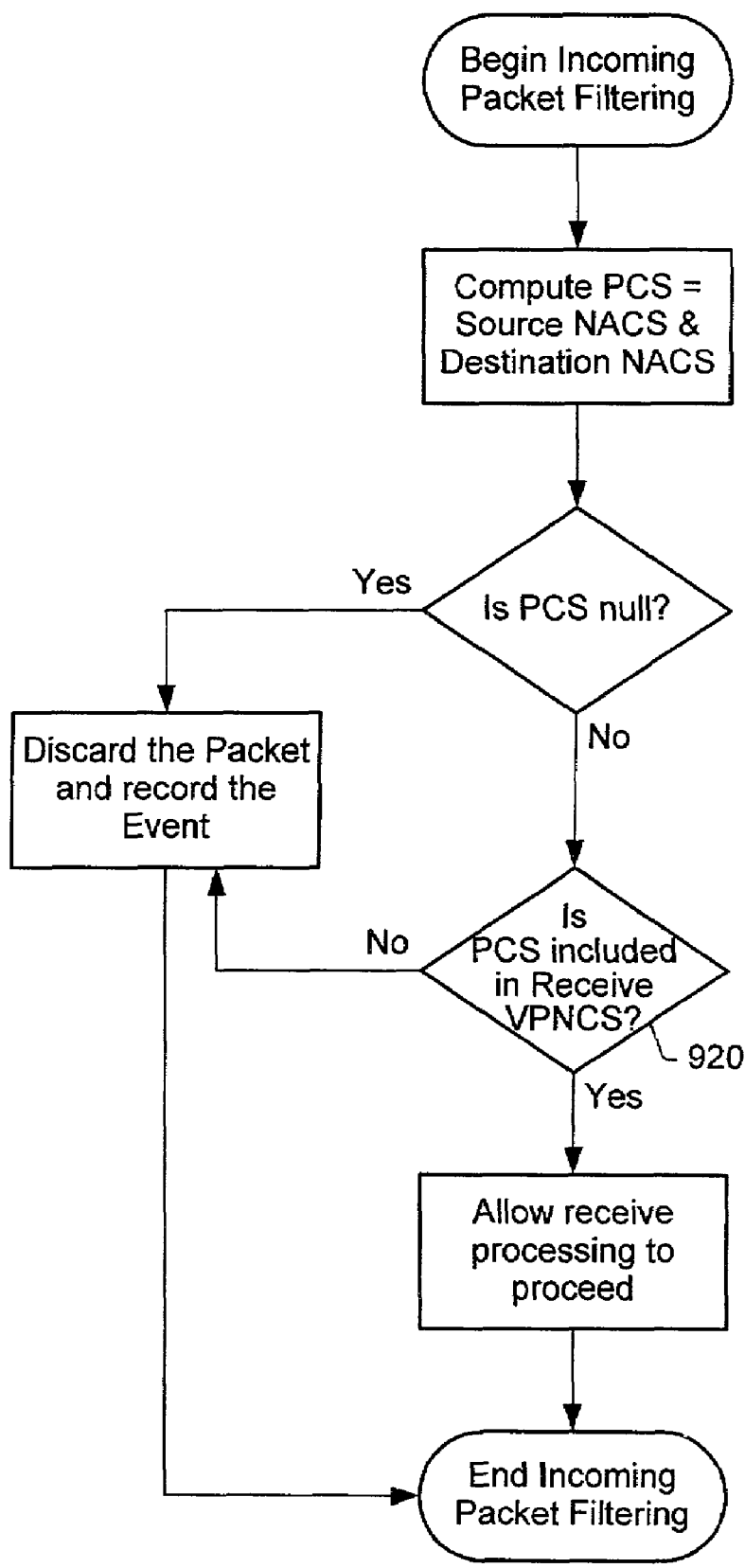
FIG. 9a is a flowchart illustrating one embodiment of a community route filter.

FIG. 9*a* is a flowchart illustrating the application of Community Route Filtering rules in the context of VPNs. The flowchart in FIG. 9 is identical to the flowchart in figure 4, with the exception of checking whether the PCS is within the VPNCS in 920 and 940 rather than within the IFCS in 420 and 440.

FIG. 9*a* is a flowchart illustrating one embodiment of a CRF. In FIG. 9*a*, the entry point "Begin Incoming Packet Filtering" is entered when a packet is received on one of MCN 810's network interfaces. The destination of the packet may be MCN 810, or MCN 810 may be forwarding the packet to another network. For incoming packet filtering, the CRF in MCN 810 computes the PCS from the intersection of the Source NACS and Destination NACS of the incoming packet. The PCS would be null if the source and destination nodes have no communities in common. Since attempts to communicate between such nodes is a violation of the community separation policy, the CRF discards the packet and records the event in a log of security-relevant and other events. If the PCS is not null, the CRF then checks whether the PCS is included in the receive VPNCS of the interface on which the packet was received (decision block 920). If it is not, this is a violation of the community separation policy and the packet is discarded. If the PCS is not included in the receive VPNCS, the CRF discards the packet and records the event. Otherwise, the CRF allows further packet receive processing to proceed.

Figure 9B:
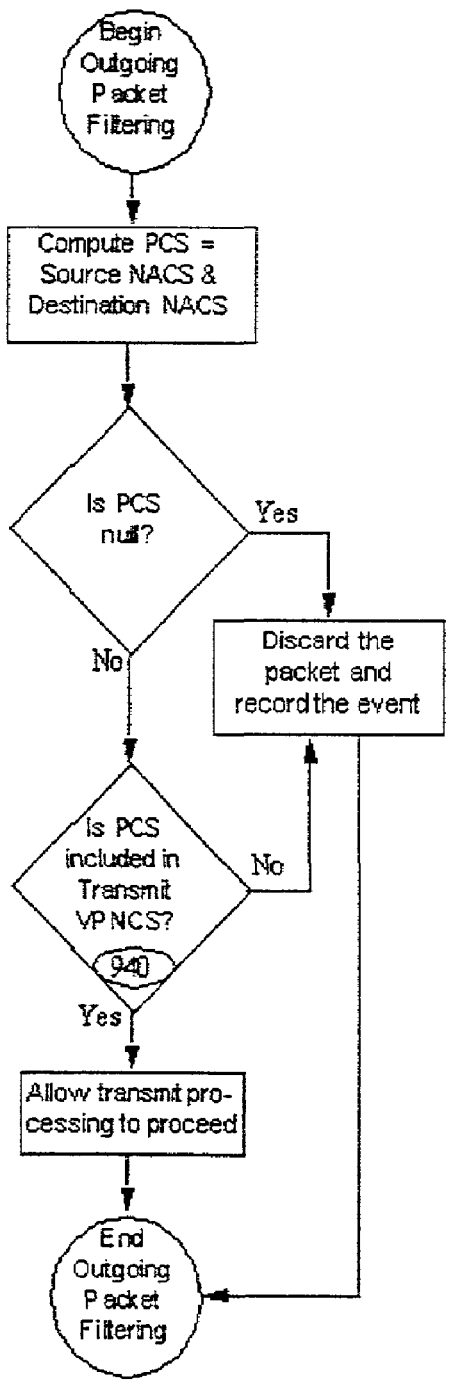
FIG. 9b is a flowchart illustrating one embodiment of a community route filter.

FIG. 9b is a flowchart illustrating one embodiment of a CRF applied to an outgoing packet in a VPN. The outgoing packet may have been generated by MCN 810, or may have been received on one of MCN's 810 network interfaces to be forwarded by MCN 810 and output on another network interface. For outgoing packet filtering, the CRF in MCN 810 computes the PCS from the intersection of the Source NACS and the Destination NACS. A null PCS indicates a violation of the community separation policy and the CRF discards the packet and records the event in a log of security relevant events and other events. If the PCS is not null, MCN 810 determines whether the PCS is included in the transmit VPNCS of the network interface on which the packet will be output (decision block 940). If it is not, a violation of the community separation security policy has been attempted, and the CRF discards the packet and records the event in a log of security relevant events and other events. Otherwise the CRF allows further transmit processing to proceed for the packet.

Community Access Control

The above discussion of community route filtering contemplates enhancing the security of the routing of data packets and may provide adequate protection in closed nodes. However, when open Multi-Community Nodes are used which may allow general user access and run untrusted applications, a more extensive mechanism may be required. To further enhance data security in a network, an additional method and mechanism, Community Access Control (CAC), may be combined with the CRF method and mechanism described above. CAC may be used to modify community separation enforcement to cover all accesses of users and user processes to resources controlled by the operating system, including the file systems, inter-process communication mechanisms (IPC), and network. CAC may be used independently, in conjunction with a community route filtering mechanism, or with other access control or filtering mechanisms.

In one embodiment, security policy enforcement may be performed by the operating system or by trusted software. The operating system provides separate protection domains for each application process, preventing applications from corrupting the kernel and other application processes, and from accessing operating systemcontrolled resources without mediation by the operating system.

In one embodiment of CAC, four classes of community sets are defined:
User Community Set (UCS)
Application Community Set (ACS)
Object Community Set (OCS)
Network Service Community Set (NSCS)

As before, community set information may be maintained in a community information base such as CIB 160 in FIG. 1.

In one embodiment, each user has a UCS which may be configured by a trusted administrator into a database of user profiles and each application process has an ACS. An application process' ACS is initially set by the user who invoked it, and may default to the UCS of the invoker. The ACS must be included in the UCS of the user who invoked the process. In one embodiment, the process may change its ACS to a subset of its original ACS.

As used herein, "objects" may include file systems, storage volumes, directories, files, memory regions, queues, pipes, sockets, input/output devices, or other operating system controlled resources. Associated with each object is an OCS. Objects are generally created by processes running on behalf of users. The object's creator is a user or user role on whose behalf the process that creates an object is running. In addition to a creator, each object has an owner. An object's owner may initially be the user who created the object. The owner may assign another user as owner. A user may become an object owner if that user's UCS includes the OCS of the object. An object's OCS is initially set by its creator (via a process running on behalf of the creator) and must be included within the UCS of its creator and within the ACS of the process which created it. The owner of an object (via a process running on the owner's behalf) may change the OCS of that object. The new OCS must be within the UCS of the owner and within the ACS of the process running on behalf of the owner which is changing the OCS.

Finally, each network service on each node has a Network Service Community Set (NSCS), which may be identified by transport layer port number or another protocol-layer multiplexing mechanism, such as the service access point in the logical link control protocol. In one embodiment, the NSCS defaults to the NACS for the node on which the service resides. It may be configured to be a subset of the NACS for the node. An application process may use the transport-layer port associated with an NSCS if the ACS of the application includes the NSCS.

In order to control access to objects, the following Object Access Rules may be utilized by an MCN:

Object Access Read Rule—An application process may read an object if the ACS of the application process is a superset of the OCS of the object to be read.

Object Access Write Rule—An application process may write an object if the ACS of the application process is a superset of the OCS of the object to be written.

Extended Community Route Filtering

By incorporating community access controls and extending the above described community route filtering mechanism, data security within an open MCN may be maintained. The following extended CRF rules may be utilized to enforce community access control on a network for open MCNs:

Extended MCN Send Rule for Outgoing Packets
1. Determine the Packet Community Set (PCS) of the packet from the intersection of the source NSCS and the destination NSCS.
2. If the PCS is null (empty), discard the packet and record the event in a log of security relevant events and other events.
3. If the PCS is not a subset of the sending process' ACS, discard the packet and record the event in a log of security relevant events and other events.

4. If the IFCS of the interface on which the packet will be output is not a superset of the PCS, discard the packet and record the event in a log of security relevant events and other events.
5. Allow transmit processing to proceed on the packet.

Extended MCN Receive Rule for Incoming Packets
1. Determine the PCS of the packet from the intersection of the source NSCS and the destination NSCS.
2. If the PCS is null (empty), discard the packet and record the event in a log of security relevant events and other events.
3. If the IFCS of the interface on which the packet was received is not a superset of the PCS, discard the packet and record the event in a log of security relevant events and other events.
4. If the destination node is the local host: if the destination process' ACS is not a superset of the PCS, discard the packet and record the event in a log of security relevant events and other events, otherwise allow receive processing to proceed on the packet.
5. If the destination node is a remote host: if the IFCS of the interface on which the packet will be output is not a superset of the PCS, discard the packet and record the event in a log of security relevant events and other events, otherwise allow transmit processing to proceed on the packet.

Alternative Extended Community Route Filtering

As an alternative to using the NSCS, a header containing the PCS may be included in transmitted packets and interpreted for received packets as follows:

Alternative Extended MCN Send Rule for Outgoing Packets
1. Determine the Packet Community Set (PCS) of the packet from the intersection of the source NACS, destination NACS, and sending process' ACS.
2. If the PCS is null (empty), discard the packet and record the event in a log of security relevant events and other events.
3. If the IFCS of the interface on which the packet will be output is not a superset of the PCS, discard the packet and record the event in a log of security relevant events and other events.
4. Encode the PCS in a header of the packet and allow transmit processing to proceed on the packet.

Alternative Extended MCN Receive Rule for Incoming Packets
1. Determine the PCS of the packet from a header in the packet.
2. If the PCS is not a subset of the intersection of the source NACS and the destination NACS, discard the packet and record the event in a log of security relevant events and other events.
3. If the IFCS of the interface on which the packet was received is not a subset of the PCS, discard the packet and record the event in a log of security relevant events and other events.
4. If the destination node is the local host: if the destination process' ACS is not a superset of the PCS, discard the packet and record the event in a log of security relevant events and other events, otherwise allow receive processing to proceed on the packet.
5. If the destination node is a remote host: if the IFCS of the interface on which the packet will be output is not a superset of the PCS, discard the packet and record the event in a log of security relevant events and other events, otherwise encode the PCS in a header of the packet and allow transmit processing to proceed on the packet.

In one embodiment, an MCN may be configured to use either the extended rules or the alternative extended rules described above. Any suitable combination of send and receive rules may be used where desired. Such a configuration may be in software or hardware, or a combination.

Figure 10:
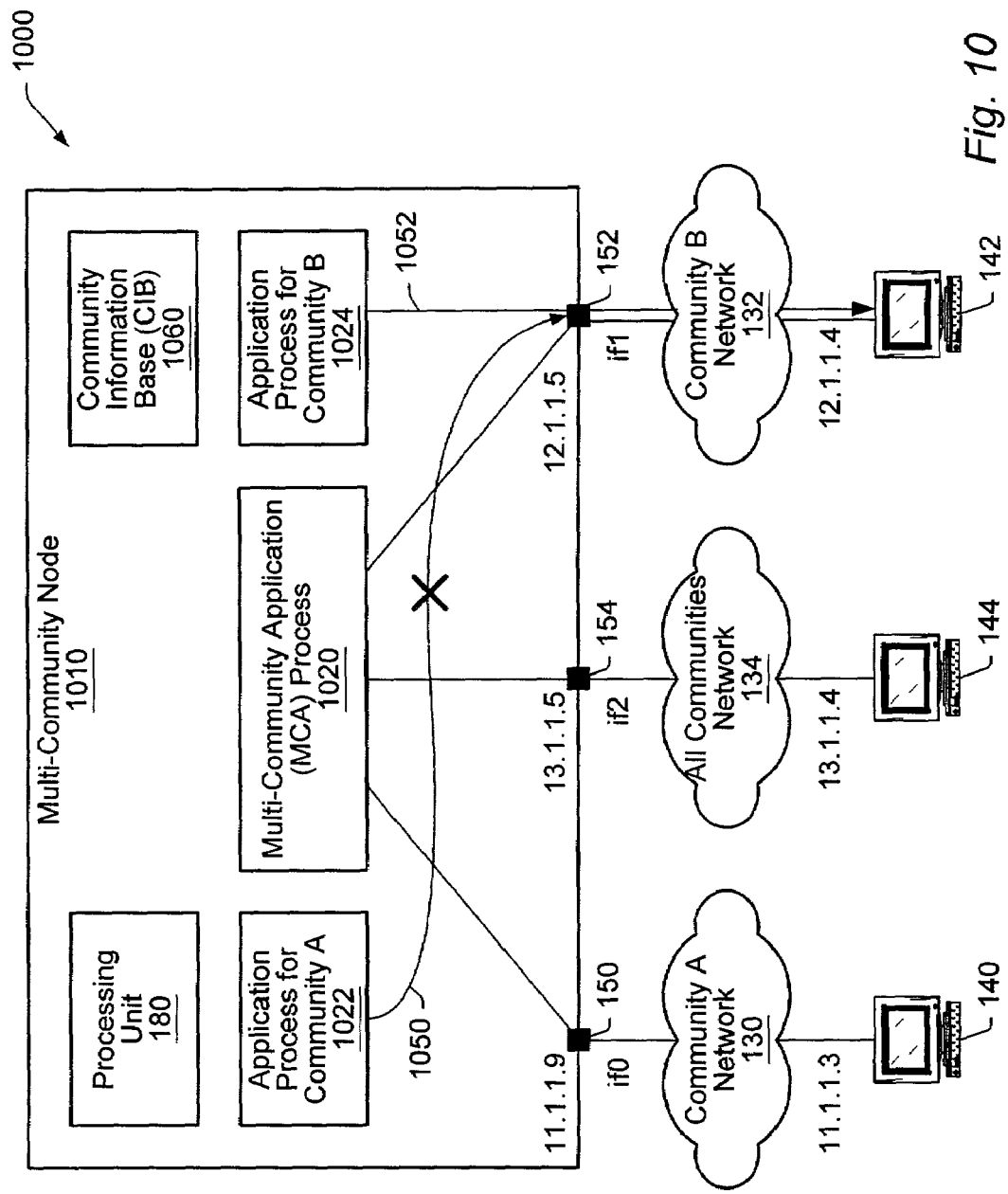
FIG. 10 illustrates an extended community route filter send rule.

FIG. 10 is a diagram illustrating one embodiment of the application of an extended CRF send rule in a computer network 1000. Included in computer network 1000 are MCN 1010 and community networks 130, 132, and 134. The ACS of the community B application process 1024 is {B}, the NACS of the source node 1010 is {A,B,C}, the NACS of the destination node is {B}, the NSCS of the source port on MCN 1010 is {B}, the NSCS of the destination port on Node 142 is {B}, and the IFCS of interface if1 152 is {B}.

In the example shown in FIG. 10, application process 1024 seeks to convey a packet 1052 to node 142. MCN 1010 applies the extended CRF send rule on the packet. The PCS of packet 1052 is determined by taking the intersection of the source NSCS and the destination NSCS. Consequently, the PCS is determined to be {B} & {B}, which equals {B}. Since the PCS is not null and is within the ACS {B} of the sending process 1024, a check is made whether the PCS is within the IFCS {B} of interface 152, the interface over which the packet will be output. Since it is (they are the same), transmit processing is allowed to proceed. If any of the checks fail, the packet would be discarded and the event would be recorded in a log of security-relevant events.

Alternatively, nodes in network 1000 may be configured to encode the PCS within a header in transmitted packets and apply the alternative CRF send rule. In such a case, MCN 1010 would determine the PCS of packet 1052 by taking the intersection of the source NACS, the destination NACS, and the sending process' ACS. Consequently, the PCS is determined to be {B} & {B} & {B}, which equals {B}. Since the PCS is not null, a check is made whether the PCS is within the IFCS {B} of interface 152, the interface over which the packet will be output. Since it is (they are the same), the PCS is encoded in a header of the packet to be sent with the packet, and transmit processing is allowed to proceed for the packet. If any of the checks fail, the packet would be discarded and the event may be recorded in a log of security-relevant events. With either the extended CRF send rule or the alternative, application process 1022 for community A is not permitted to send a packet over interface 152 to the Community B network.

Figure 11:
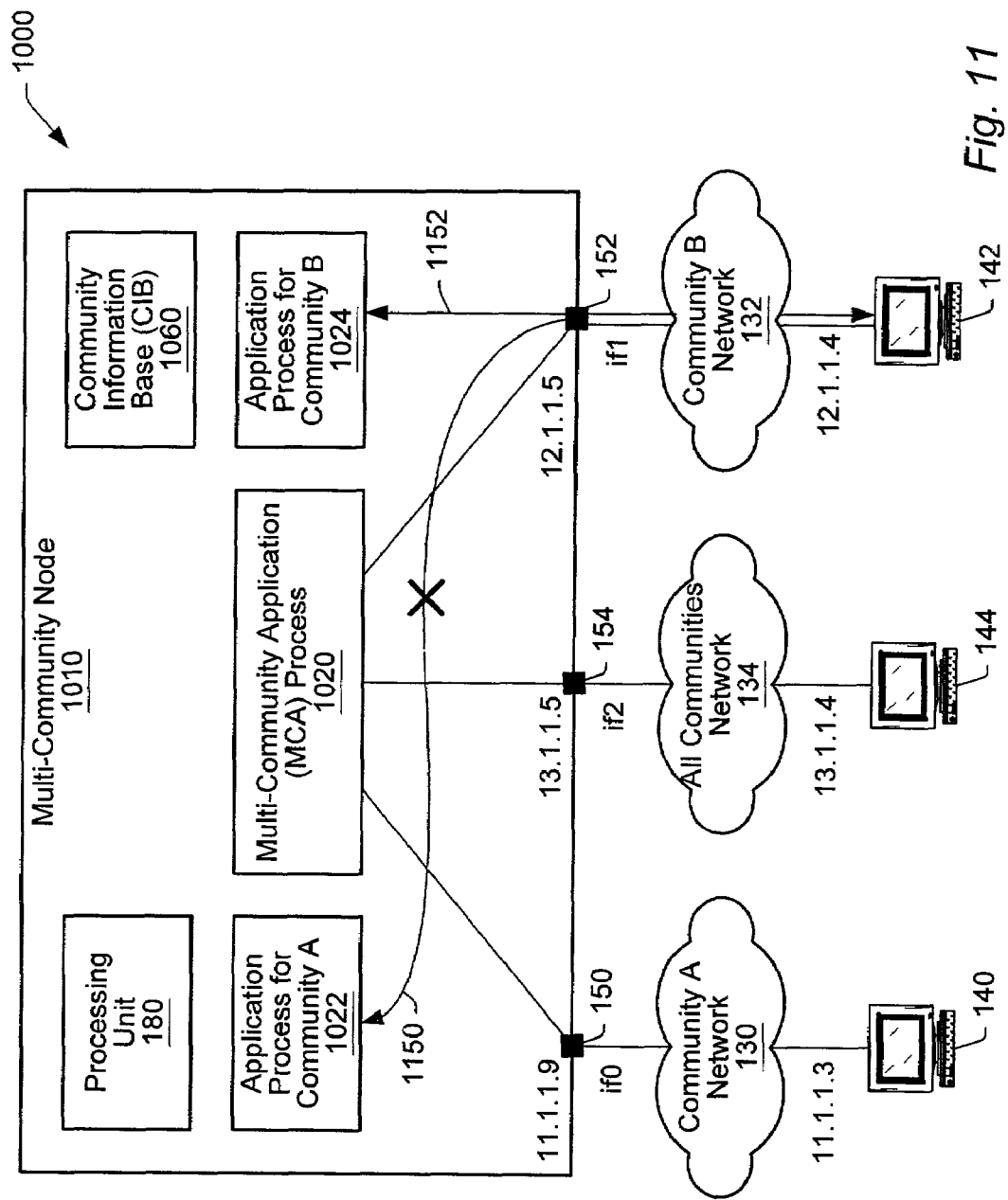
FIG. 11 illustrates an extended community route filter receive rule.

In the example of FIG. 11, application process 1024 receives a packet 1152 from node 142. MCN 1010 applies the extended CRF receive rule on the packet. The PCS of packet 1152 is determined by taking the intersection of the source NSCS and the destination NSCS. Consequently, the PCS is determined to be {B} & {B}, which equals {B}. Since the PCS is not null, a check is made whether the PCS is within the IFCS {B} of interface if1 152, the interface over which the packet was received. Since it is (they are the same), the packet is not discarded. A further check is made as to whether that the PCS is within the ACS {B} of the destination process 1024. Since it is, receive processing is allowed to proceed for the packet. If any of the checks fail, the packet would be discarded and the event would be recorded in a log of security-relevant events.

Alternatively, nodes in network 1000 may be configured to include the PCS within a header in transmitted packets and apply the alternative CRF receive rule. In such a case, MCN 1010 would determine the PCS {B} of a packet encoded within a header of the packet. It would validate the PCS is within the intersection {B} of the source NACS {B} of node 142 and the destination NACS {A,B,C} of MCN 1010. Since it is, a check is made whether the PCS is within the IFCS {B} of interface if1 152, the interface over which the packet was received. Since it is (they are the same), and since the destination node is the local host, a check is made whether the PCS is within the destination process 1024's ACS. Since it is, receive processing is allowed to proceed for the packet. If any of the checks fail, the packet would be discarded and the event would be recorded in a log of security-relevant events.

With either the extended CRF receive rule or the alternative, application process 1022 for community A is not permitted to receive a packet from interface 152 which is attached to the community B network. For example, as shown in FIG. 11, if node 142 seeks to send a packet to application process A 1022, the PCS of the packet may be determined from the intersection of the source NSCS and the destination NSCS. In this case the source NSCS is {B} and the destination NSCS is {A}. Because the PCS of the packet is null, the packet is discarded and an record of the event may be made.

Figure 12:
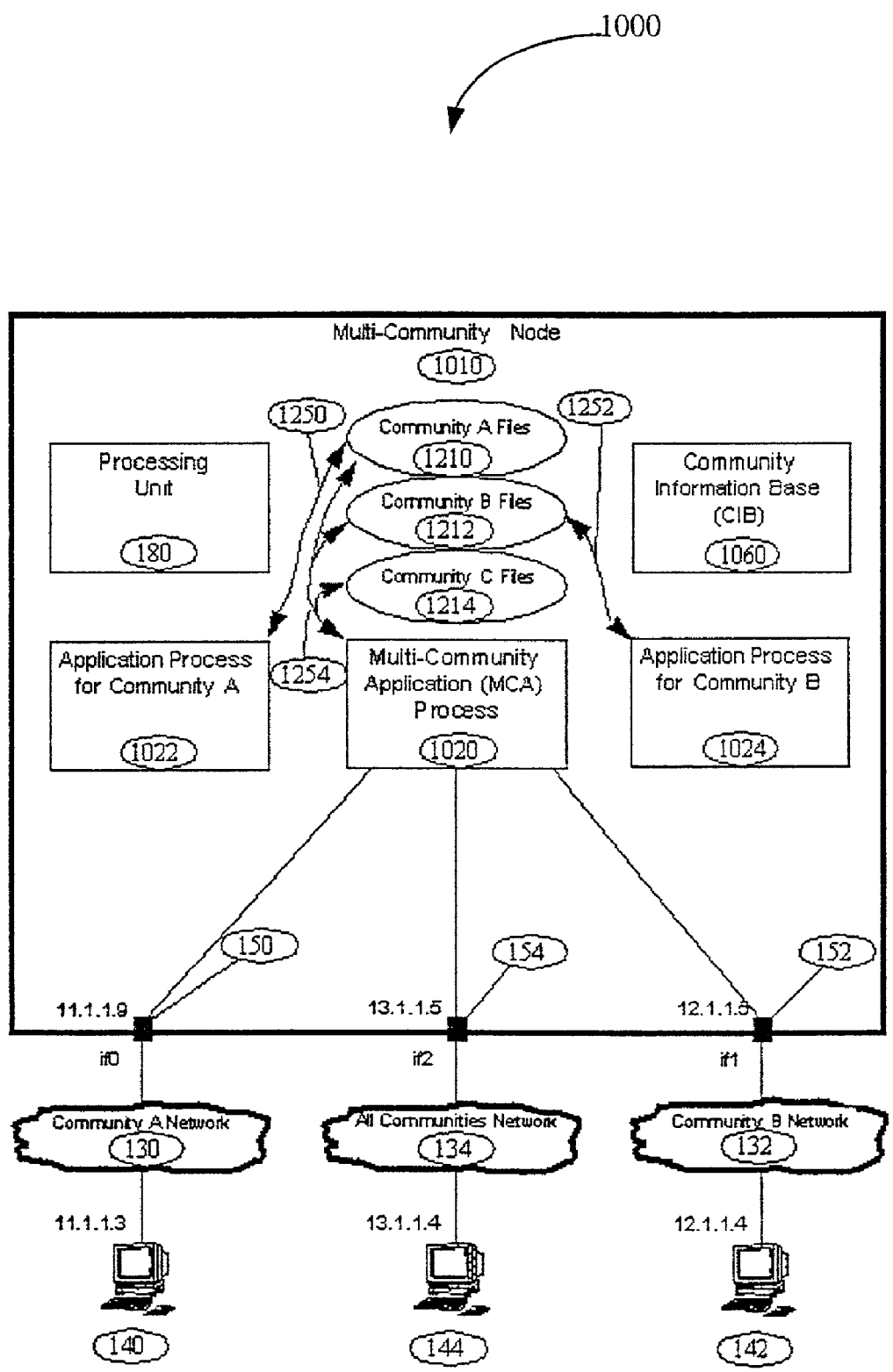
FIG. 12 is a diagram illustrating community access control.

FIG. 12 is an embodiment illustrating the use of community access control in an open node. Illustrated within MCN 1010 is a file system containing files of Community A 1210, Community B 1212, and Community C 1214. The OCS of these files is set by the owner of the file (initially the creator) to a subset of the owner's UCS. An owner may retain ownership or assign ownership to another user, who then may change the OCS to any set of communities within his UCS. Also shown are application processes running in MCN 1010. Process 1022 has an ACS of {A}, since it runs on behalf of a user in community A. Process 1024 has an ACS of {B} since it runs on behalf of a user in community B. Process 1020 is an MCA for all of MCN 1010's communities, i.e., communities A, B, and C.

FIG. 12 illustrates which processes are allowed to access which files by using the community access control rules described above. Community A Process 1022 is allowed to access 1250 Community A Files 1210, Community B Process 1024 is allowed to access 1252 Community B Files 1212, and MCA 1020 is allowed to access 1254 files for all communities A 1210, B 1212, and C 1214. Community A Process 1022 is not allowed to access Community B 1212 and C 1214 files. Similarly, Community B Process 1024 is not allowed to access Community A 1210 and C 1214 files. In addition to controlling access to a file system, community access control may be applied to other system resources, such as interprocess communication (IPC) mechanisms. Some well-know types of IPC mechanisms include pipes, semaphores, mutexes, shared memory regions, and message queues. For open MCNs, access to all such objects must be controlled in accordance with the community access control rules in order to ensure that the community separation policy is not be violated.

Controlled Information Flow Between Communities

A firewall is a well known device connected to two or more different networks which selectively forwards packets from one network to another according to packet filtering rules. Firewalls may operate at all layers of the protocol stack, including the application layer. Frequently, a firewall's selective packet forwarding is between different community networks. Thus, rather than provide complete separation between communities, the enterprise's security policy is to allow limited communications between communities as specified in the firewall rules.

For example, in a bank, a firewall may be installed between three internal networks: (1) the internal Production Network for day-to-day banking operations, (2) the internal Development Network for new production systems, and (3) the Demilitarized Zone (DMZ) Network on which the bank's public web server resides. The DMZ is typically connected to the Internet through another firewall. The bank's security policy may state that it is acceptable to transfer electronic commerce transactions from the public web server in the DMZ to the Production Network. If community access control and extended community route filtering rules were applied as specified above, no information could flow between these networks. In such situations, when the firewall should permit flows between community networks, it must change the PCS of a packet so that the packet may flow from one community to another. In order to do so, the firewall's filtering rules are modified to allow the community set of the sender of a packet to be specified, and to allow the community set of the destination to which the packet may be forwarded to also be specified. The community route filtering rules need also be modified to allow for the change of a PCS within the firewall.

In one embodiment, attributes are added to the filtering rules which allow the specification of an Incoming PCS before the rule match and an Outgoing PCS after the rule match. Using these new attributes, the packet processing may be enhanced to take into account the multi-community role of the firewall. The following rules describe one embodiment of community separation control in a firewall.

1. When a firewall receives a packet, the firewall determines the Incoming PCS via a method selected by a trusted network administrator: either from the source NACS, source NSCS, or from a PCS encoded in a header of the packet.
2. If the PCS is not within the IFCS of the interface on which the packet was received, the firewall discards the packet and records the event in a log of security relevant events and other events.
3. If the PCS is within the IFCS of the interface on which the packet was received, the firewall's packet filtering mechanism performs an additional comparison of the actual Incoming PCS with the Incoming PCS specified in the rule. The filtering rule action is invoked when all parameters, including the Incoming PCS, match.
4. If there is no match, the firewall performs the action for no match, which typically is to discard the packet and record the event in a log of security relevant events and other events.
5. If there is a match, and the action is to forward the packet, the firewall changes the PCS to the Outgoing PCS specified in the rule.
6. The firewall compares the Outgoing PCS with either the destination NACS or destination NSCS, whichever method is selected by a trusted network administrator. If the Outgoing PCS is not within the destination NACS or NSCS, the packet is discarded and the event is recorded in a log of security relevant events and other events.
7. If the Outgoing PCS is within the destination NACS or NSCS and is within the IFCS of the interface on which the packet will be transmitted, the firewall optionally encodes the PCS in a header of the packet, and allows packet transmit processing to proceed. Otherwise, the packet is discarded and the event is recorded in a log of security relevant events and other events.

A similar mechanism may be employed on MCNs sending packets through the firewall to destinations not in their community set, to allow for selective inter-community communications.

Figure 13:
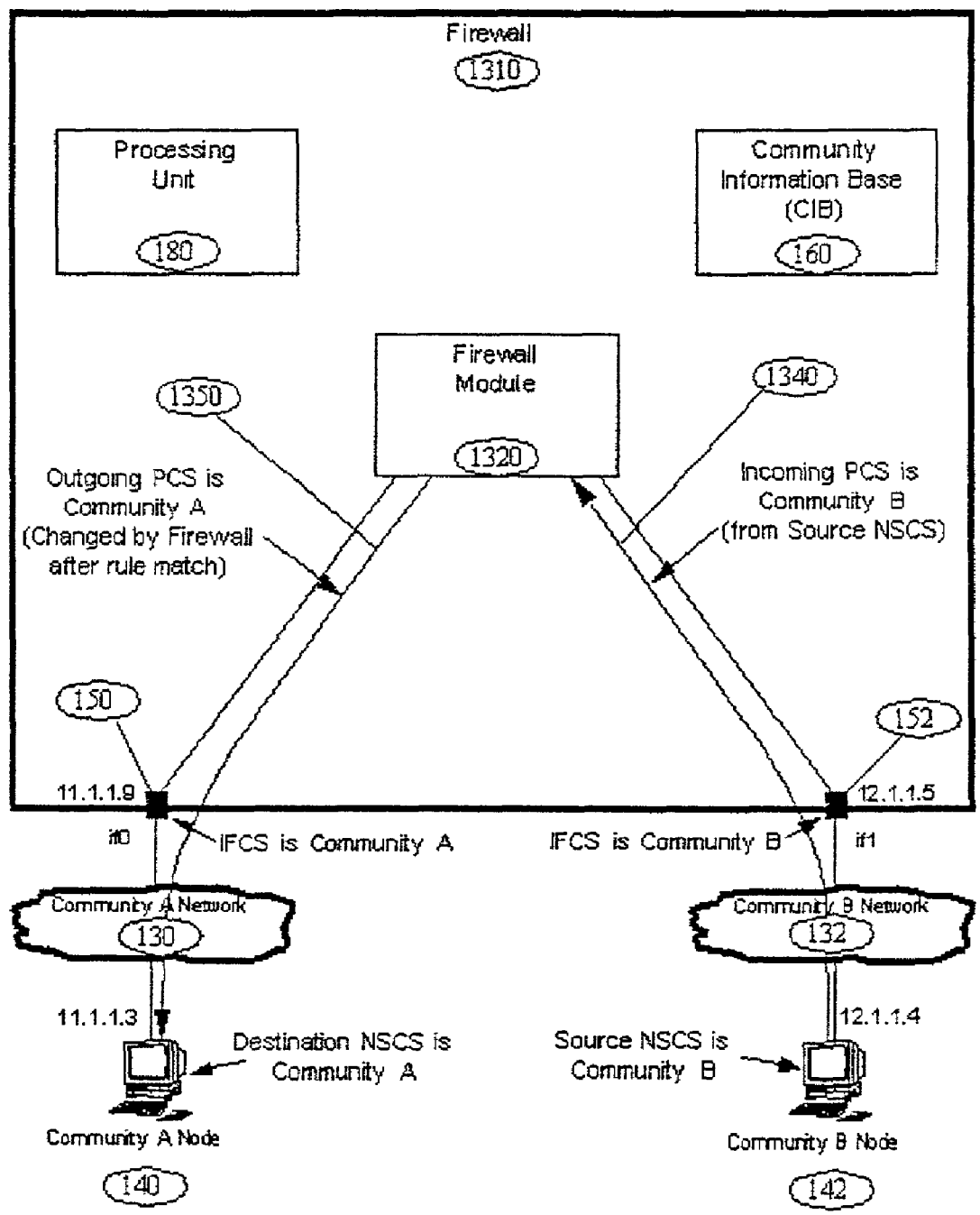
FIG. 13 is a diagram illustrating controlled information flow between communities through a firewall.

FIG. 13 shows one embodiment of a firewall 1310 between two Community Networks, 130 and 132. Community B Node 142 sends a packet to the Firewall 1310, destined for Community A Node 140. In the example of FIG. 13, Firewall 1310 determines that the Incoming PCS is {B} from the NSCS {B} for Node 140, and that the Incoming PCS is a subset of the IFCS {B} of interface if1, the interface on which the packet was received. A filtering rule in Firewall 1310 allows packets of this type to be forwarded from Community B to Community A. In the embodiment shown, the filtering rule which matches the received packet includes Incoming PCS and Outgoing PCS attributes. If the Incoming PCS that was determined for the data packet matches the Incoming PCS attribute in the matching rule, further processing is permitted. Otherwise, the data packet may be discarded. If further processing is permitted, the Firewall 1310 changes the PCS of the data packet to the Outgoing PCS {A} as specified in the filtering rule. Firewall 1310 then determines whether or not the Outgoing PCS {A} is within the NSCS {A} of Node 140, and if the Outgoing PCS is within the IFCS {A} of if0, the network interface on which the packet will be transmitted. Since these checks pass, the packet is forwarded to the Community A network.

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or nonvolatile media such as RAM (e.g. SDRAM, RDRAM, SRAM, etc.), ROM, etc. as well as transmission media or signals such as electrical, electromagnetic, or digital signals, conveyed via a communication medium such as network and/or a wireless link.

It is noted that the examples and figures described above are intended to be exemplary. Numerous variations and modifications will become apparent to those skilled in the art once the above disclosure is fully appreciated. Further, the above described methods and mechanisms may be used independently or in one of many combinations with each other where desired.

What is claimed is:

1. A method of community access control in a Multi-Community Node (MCN), said method comprising:
   receiving a request for access to an object;
   consulting a community information base (CIB) responsive to said request, wherein said CIB includes:
      a user community set (UCS) for each user of said MCN, wherein for a given user and associated UCS, a given community is a member of the UCS if the given user is a member of the given community;
      an application community set (ACS) for each application on said MCN, wherein for a given application and associated ACS, a given community is a member of the ACS if the given application runs on behalf of a user in the given community; and
      an object community set (OCS) for each object residing within said MCN, wherein each OCS is included in an ACS of a process which created it;
   permitting access to said object in response to detecting:
      said request is from a first user; and
      a UCS of the first user is a superset of an OCS of said object;
   denying access to said object in response to detecting:
      said request is from the first user; and
      a UCS of the first user is not a superset of an OCS of said object;
   permitting access to said object in response to detecting:
      said request is from a process; and
      an ACS of said process is a superset of an OCS of said object; and
   denying access to said object in response to detecting:
      said request is from said process; and
      an ACS of said process is not a superset of an OCS of said object;
   wherein a given OCS comprises a first set of communities, a given UCS is a superset of the given OCS if at least all of the first set of communities are also included in the given UCS, and a given ACS is a superset of the given OCS if at least all of the first set of communities are also included in the given ACS.

2. The method of claim 1, wherein said object is an operating system controlled resource.

3. The method of claim 2, wherein said object is selected from the group consisting of a file system, a storage volume, a directory, a file, a record, a memory region, a queue, a pipe, a socket, a port, or an input/output device.

4. The method of claim 1, wherein an initial owner of said object is a creator of said object.

5. The method of claim 1, further comprising permitting an owner of said object to designate a first user as a new owner of said object, in response to detecting a UCS of said first user is a superset of said OCS.

6. The method of claim 1, further comprising allowing a first process to change said OCS of said object to a subset of said ACS of said first process, in response to detecting an owner of said first process is an owner of said object and said ACS is a superset of said OCS.

7. The method of claim 1, wherein said CIB further includes a creator and a current owner for each object residing within said MCN.

8. A Multi-Community Node (MCN) comprising:
   a community information base (CIB), wherein said CIB includes:
      a user community set (UCS) for each user of said MCN, wherein for a given user and associated UCS, a given community is a member of the UCS if the given user is a member of the given community;
      an application community set (ACS) for each application on said MCN, wherein for a given application and associated ACS, a given community is a member of the ACS if the given application runs on behalf of a user in the given community; and
      an object community set (OCS) for each object residing within said MCN, wherein each OCS is included in an ACS of a process which created it;
   a processing unit configured to:
      receive a request for access to an object;
      consult said CIB responsive to said request;
      permit access to said object in response to detecting:
         said request is from a first user; and
         a UCS of the first user is a superset of an object community set (OCS) of said object;
      deny access to said object in response to detecting:
         said request is from the first user; and
         a UCS of the first user is not a superset of an OCS of said object;
      permit access to said object in response to detecting:
         said request is from a process; and
         an ACS of said process is a superset of said OCS; and deny access to said object in response to detecting:
said request is from said process; and
an ACS of said process is not a superset of an OCS of said object;
wherein a given OCS comprises a first set of communities, a given UCS is a superset of the given OCS if at least all of the first set of communities are also included in the given UCS, and a given ACS is a superset of the given OCS if at least all of the first set of communities are also included in the given ACS.

9. The MCN of claim 8, wherein said object is an operating system controlled resource.

10. The MCN of claim 9, wherein said object is selected from the group consisting of a file system, a storage volume, a directory, a file, a record, a memory region, a queue, a pipe, a socket, a port, or an input/output device.

11. The MCN of claim 8, wherein an initial owner of said object is a creator of said object.

12. The MCN of claim 8, wherein said processing unit is further configured to permit an owner of said object to designate a first user as a new owner of said object, in response to detecting a UCS of said first user is a superset of said OCS.

13. The MCN of claim 8, wherein said processing unit is further configured to allow a first process to change said OCS of said object to a subset of said ACS of said first process, in response to detecting an owner of said first process is an owner of said object and said ACS is a superset of said OCS.

14. The MCN of claim 8, wherein said CIB further includes a creator and a current owner for each object residing within said MCN.

15. A computer system comprising:
a computer network; and
a multi-community node (MCN) coupled to said computer network, wherein said MCN comprises:
a community information base (CIB), wherein said CIB includes:
a user community set (UCS) for each user of said MCN, wherein for a given user and associated UCS, a given community is a member of the UCS if the given user is a member of the given community;
an application community set (ACS) for each application on said MCN, wherein for a given application and associated ACS, a given community is a member of the ACS if the given application runs on behalf of a user in the given community; and
an object community set (OCS) for each object residing within said MCN, wherein each OCS is included in an ACS of a process which created it;
a processing unit configured to:
receive a request for access to an object;
consult said CIB responsive to said request;
permit access to said object in response to detecting:
said request is from a first user; and
a UCS of the first user is a superset of an object community set (OCS) of said object;
deny access to said object in response to detecting:
said request is from the first user; and
a UCS of the first user is not a superset of an OCS of said object;
permit access to said object in response to detecting:
said request is from a process; and
an ACS of said process is a superset of said OCS; and
deny access to said object in response to detecting:
said request is from said process; and
an ACS of said process is not a superset of an OCS of said object;
wherein a given OCS comprises a first set of communities, a given UCS is a superset of the given OCS if at least all of the first set of communities are also included in the given UCS, and a given ACS is a superset of the given OCS if at least all of the first set of communities are also included in the given ACS.

16. The computer system of claim 15, wherein said object is an operating system controlled resource.

17. The computer system of claim 16, wherein said object is selected from the group consisting of a file system, a storage volume, a directory, a file, a record, a memory region, a queue, a pipe, a socket, a port, or an input/output device.

18. The computer system of claim 15, wherein an initial owner of said object is a creator of said object.

19. The computer system of claim 15, wherein said processing unit is further configured to permit an owner of said object to designate a first user as a new owner of said object, in response to detecting a UCS of said first user is a superset of said OCS.

20. The computer system of claim 15, wherein said processing unit is further configured to allow a first process to change said OCS of said object to a subset of said ACS of said first process, in response to detecting an owner of said first process is an owner of said object and said ACS is a superset of said OCS.

21. The computer system of claim 15, wherein said CIB further includes a creator and a current owner for each object residing within said MCN.

22. A storage media comprising program instructions, wherein said program instructions are executable to:
receive a request for access to an object;
consult a community information base (CIB) responsive to said request, wherein said CIB includes:
a user community set (UCS) for each user of said MCN, wherein for a given user and associated UCS, a given community is a member of the UCS if the given user is a member of the given community;
an application community set (ACS) for each application on said MCN, wherein for a given application and associated ACS, a given community is a member of the ACS if the given application runs on behalf of a user in the given community; and
an object community set (OCS) for each object residing within said MCN, wherein each OCS is included in an ACS of a process which created it;
permit access to said object in response to detecting:
said request is from a first user; and
a UCS of the first user is a superset of an OCS of said object; and
deny access to said object in response to detecting:
said request is from the first user; and
a UCS of the first user is not a superset of an OCS of said object;
permit access to said object in response to detecting:
said request is from a process; and
an ACS of said process is a superset of an OCS of said object; and
deny access to said object in response to detecting:
said request is from said process; and
an ACS of said process is not a superset of an OCS of said object;
wherein a given OCS comprises a first set of communities, a given UCS is a superset of the given OCS if at least all of the first set of communities are also included in the given UCS, and a given ACS is a superset of the given OCS if at least all of the first set of communities are also included in the given ACS.

23. The storage media of claim 22, wherein said object is an operating system controlled resource.

24. The storage media of claim 23, wherein said object is selected from the group consisting of a file system, a storage volume, a directory, a file, a record, a memory region, a queue, a pipe, a socket, a port, or an input/output device.

25. The storage media of claim 22, wherein an initial owner of said object is a creator of said object.

26. The storage media of claim 22, wherein said program instructions are further executable to permit an owner of said object to designate a first user as a new owner of said object, in response to detecting a UCS of said first user is a superset of said OCS.

27. The storage media of claim 22, wherein said program instructions are further executable to allow a first process to change said OCS of said object to a subset of said ACS of said first process, in response to detecting an owner of said first process is an owner of said object and said ACS is a superset of said OCS.

28. The storage media of claim 22, wherein said CIB further includes a creator and a current owner for each object residing within said MCN.

* * * * *